(12) United States Patent
Irwin et al.

(10) Patent No.: US 6,450,914 B1
(45) Date of Patent: Sep. 17, 2002

(54) ADJUSTABLE AXLE SHAFT ENDPLAY

(75) Inventors: Earl James Irwin, Fort Wayne; David Joseph Young, Kimmell; Dale Allen Berning, Fort Wayne, all of IN (US)

(73) Assignee: Spicer Technology, Inc., Fort Wayne, IN (US)

( * ) Notice: Subject to any disclaimer, the term of this patent is extended or adjusted under 35 U.S.C. 154(b) by 0 days.

(21) Appl. No.: 09/759,517

(22) Filed: Jan. 16, 2001

(51) Int. Cl.$^7$ ................................................ F16H 40/06
(52) U.S. Cl. ......................................... 475/230; 74/607
(58) Field of Search ............................. 74/607; 475/230

(56) References Cited

U.S. PATENT DOCUMENTS

| | | | |
|---|---|---|---|
| 1,006,847 A | 10/1911 | Heaslet | |
| 1,226,854 A | 5/1917 | Bower | |
| 1,422,401 A | 7/1922 | White | |
| 3,198,036 A | 8/1965 | Muller | |
| 3,310,999 A | * 3/1967 | Griffith | ........................ 475/230 |
| 4,630,506 A | * 12/1986 | Allmandinger et al. | ..... 475/230 |
| 5,620,388 A | 4/1997 | Schlegelmann et al. | |
| 5,984,822 A | 11/1999 | Schreier et al. | |

* cited by examiner

*Primary Examiner*—Dirk Wright
(74) *Attorney, Agent, or Firm*—Liniak, Berenato, Longacre & White

(57) ABSTRACT

The device for adjusting an endplay of an axle shaft in a differential assembly includes an axle shaft supported in a differential case for rotation about a longitudinal axis, and an endplay adjustment member threadedly mounted on a terminal shoulder provided at an inboard end of the axle shaft. The axle shaft has external splines adapted to mate with internal splines of a differential side gear and an annular groove located adjacent to the terminal shoulder. The annular groove receives a retainer ring provided to limit an axial displacement of the axle shaft in an outboard direction. The endplay adjustment member is selectively positionable on the terminal shoulder along the axial direction of the axle shaft to variably limit an axial movement of the retainer ring within the annular groove, thus adjusting the axle shaft endplay.

10 Claims, 4 Drawing Sheets

ADJUSTABLE AXLE SHAFT ENDPLAY

BACKGROUND OF THE INVENTION

1. Field of the Invention

This invention pertains to differential systems for motor vehicles and, more particularly, the invention pertains to a device and method for adjusting an axle shaft endplay in a differential assembly.

2. Description of the Prior Art

In conventional drivelines, particularly those for rear wheel drive vehicles, the left-hand and right-hand axle shafts extend laterally from a differential mechanism that includes side bevel gears in continuous meshing engagement with differential pinions supported rotatably on a pinion shaft carried on a differential carrier. The differential carrier is driven rotatably by a set of meshing bevel gears, one of which is driven by a drive shaft disposed substantially perpendicular to the axle shafts. The side bevel gears typically are connected rotatably to the axle shafts by a spline connection formed on a shoulder near the inboard ends of the axle shafts. Each axle shaft carries a terminal shoulder at its axially innermost extremity, the terminal shoulder is located adjacent to the differential pinion shaft.

Located between the shoulders on the axle shaft is an annular recess that is axially aligned with the recess formed on the corresponding side bevel gear. A slotted washer or retainer ring, fitted within the recesses of the axle shaft and side bevel gear, limits outward axial movement of the axle shaft relative to the side bevel gear. However, each axle shaft is free to move along the spline connection axially inward toward the differential pinion shaft. This amount of an internal axial clearance is called an axle shaft endplay.

The excessive amount of the endplay in the differential assemblies allows the axle shafts to shift axially inwardly relative to the differential case and jar or knock against the pinion shaft. Moreover, the conventional assembly can lead to grinding away of the end of the side yoke causing excessive negative camber, which in turn can lead to uneven tire wear and poor driving stability. It can also cause particles of the side yokes to embed themselves in the differential clutch plates causing slippage of the differential unit resulting in a clunking or thumping noise. If the wear is left unchecked, it may increase to a point where the flange will shear or cut into the differential case causing a leakage of fluid and ultimately leading to complete destruction of the differential assembly.

The current retention method of the axle shaft does not allow an endplay control. Therefore, the need exists to control the endplay of the axle shaft in order to provide a predetermined desired endplay in accordance with vehicle manufacturer's specification and/or depending on the operational conditions of the axle assembly in a simple, efficient and inexpensive manner.

SUMMARY OF THE INVENTION

It is an object of the present invention to provide a device and a method for adjusting an axle shaft endplay in a differential assembly.

A device, according to the present invention, for adjusting an endplay of an axle shaft in a differential assembly includes an axle shaft supported in a differential case for rotation about a longitudinal axis, and an endplay adjustment member. The axle shaft has external splines adapted to mate with internal splines of a differential side gear and an annular groove located adjacent to a terminal shoulder provided at an inboard end of the axle shaft. The annular groove receives a retainer ring provided to limit an axial displacement of the axle shaft in an outboard direction. A cylindrical outer peripheral surface of the axle shaft terminal shoulder is provided with external helical threads engaging internal threads of the endplay adjustment member. The endplay adjustment member is selectively positioned on said terminal shoulder along the axial direction of said axle shaft to variably limit an axial movement of the retainer ring within the annular groove, thus adjusting the axle shaft endplay.

With this arrangement of the differential assembly, the method for adjusting an axle shaft endplay in a differential assembly is performed in the following manner: first, a value of a desired endplay is determined based on particular operational conditions and the type of the differential assembly. A differential mechanism is then partially assembled including side gears and the axle shafts one at a time inserted through the side gears where the retainer ring is mounted to the axle shaft and the endplay adjustment member is fully threaded onto the terminal shoulder thereof. The shaft is then pulled outboard until the retainer ring contacts with the side gear. Then a pinion shaft carrying bevel pinion gears is assembled and locked in place. After that, the axle shaft endplay is measured between an inboard contact face of the axle shaft and the pinion shaft. The endplay adjustment member is then rotated on the terminal shoulder so as to provide the desired endplay $\delta_P$. Finally, remaining components of the differential assembly are assembled, thus, completing the process of assembling the differential assembly. The same procedure is then repeated for the other axle.

Therefore, the present device and method for adjusting the endplay of the axle shaft solve the need for a solution to the problem of controlling the axle shaft endplay in the vehicular differential assemblies in a simple, efficient and inexpensive manner.

These and other structural and functional benefits of the present invention will become apparent from the following description and associated drawings.

DESCRIPTION OF THE PREFERRED EMBODIMENT

Figure 1:
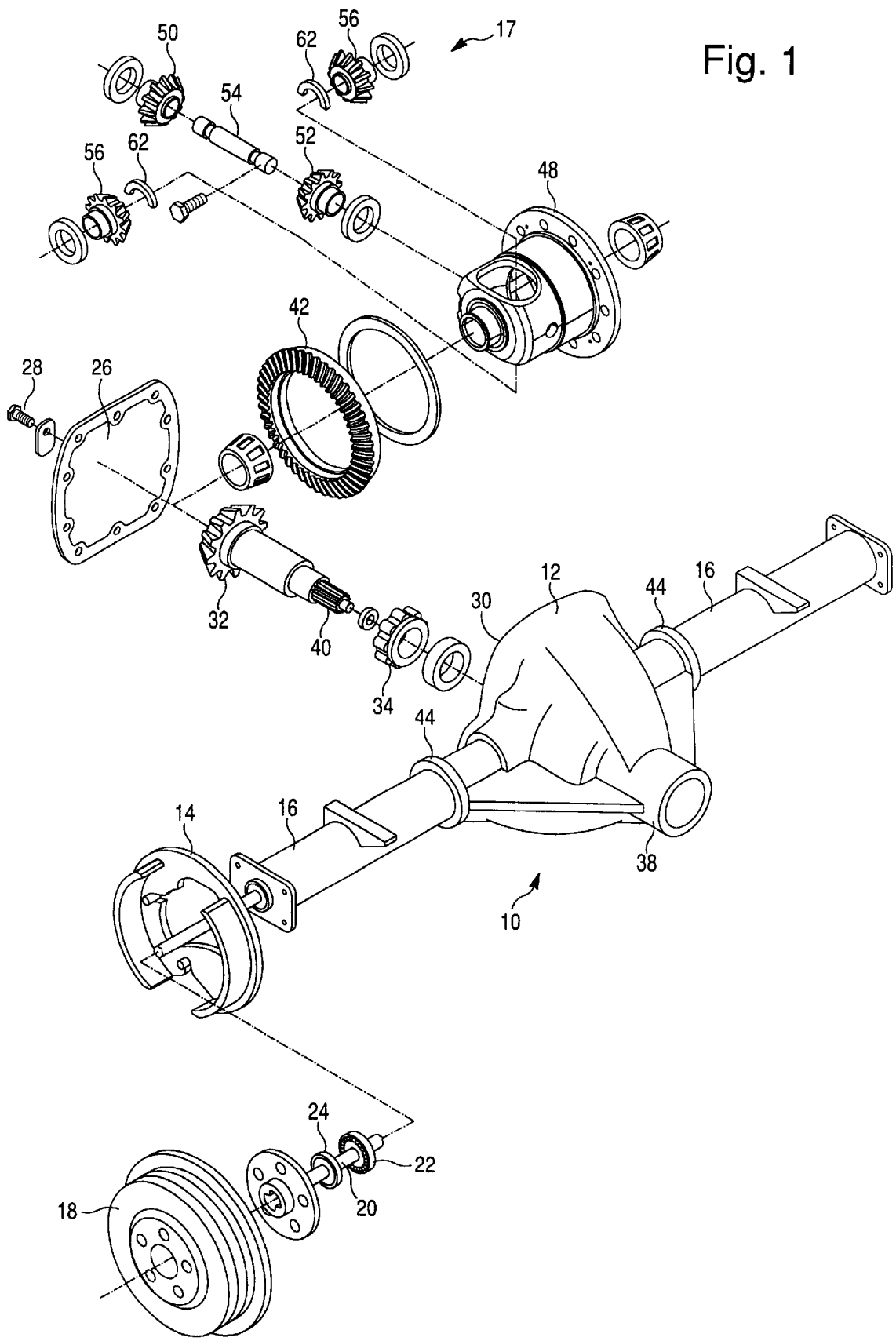
FIG. 1 is an exploded perspective view of an axle assembly including a differential assembly.
Figure 2:
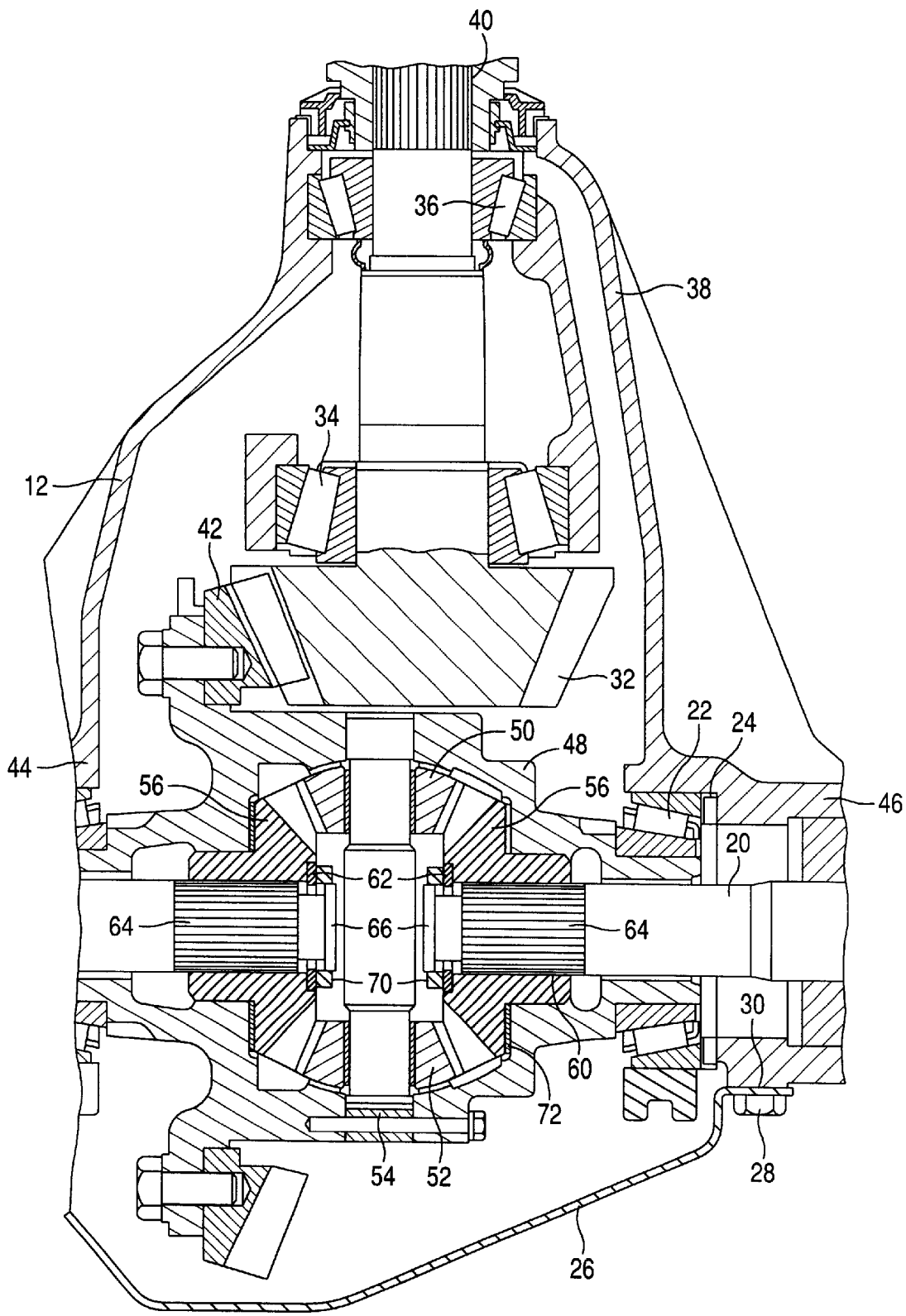
FIG. 2 is a cross section through the differential assembly of FIG. 1.

Referring first to FIGS. 1 and 2, an axle assembly 10, to which the present invention can be applied, includes an axle housing 12, which contains a differential assembly 17 and a reservoir of hydraulic lubricant, brake assembly 14 located at the end of an axle tube 16 extending outboard from the ends of the axle housing 12, brake drum 18, axle shafts 20, axle shaft bearings 22, and bearing seals 24.

A cover 26 is connected by bolts 28 to a rear face 30 of the housing 12 hydraulically sealing the housing against the passage of lubricant.

Located within the axle housing 12 is a drive pinion 32 rotatably supported by a rear drive pinion bearing 34 and a front drive pinion bearing 36 supported on an inner surface of a portion of an axle carrier casing 38 that extends forward from a center line of the axle assembly. A drive shaft (not shown), drivably connected to an output shaft of a transmission (not shown), is connected through splines 40 to the shaft that drives the drive pinion 32.

The axle housing assembly 12 also includes laterally directed tubular extensions 44, which receive therein the axle tubes 16. Located within the axle housing 12 is a differential case 48 housing a differential mechanism. The differential mechanism includes a ring gear 42, in continuous meshing engagement with the drive pinion 32. The differential case 48 supports bevel pinion gears 50, 52 for rotation on a differential pinion shaft or cross pin 54. Side bevel gears 56 are in continuous meshing engagement with the pinions 50, 52 and are drivably connected to left and right axle shafts, located within the axle tubes 16.

Figure 3:
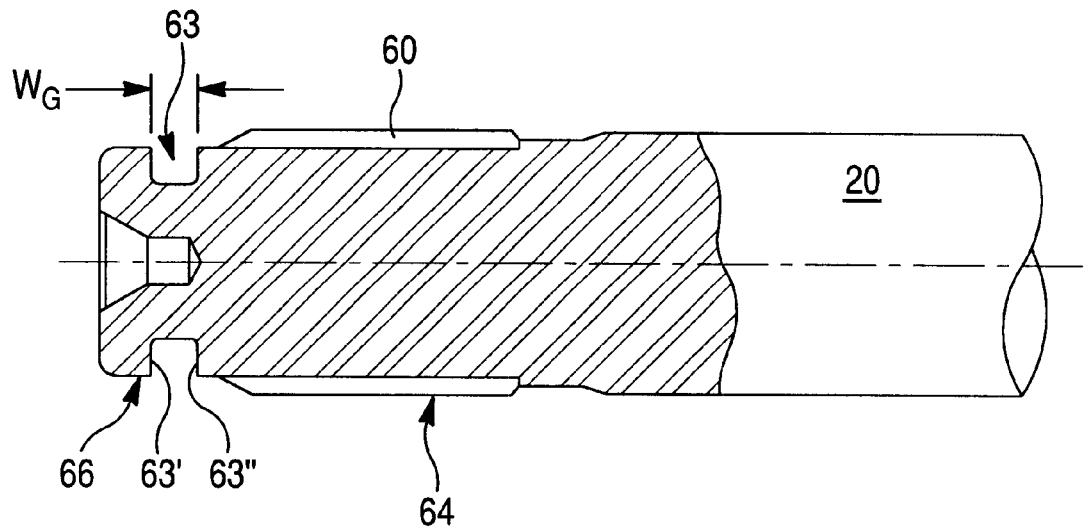
FIG. 3 is a sectional view of an onboard end of a conventional axle shaft.
Figure 4A:
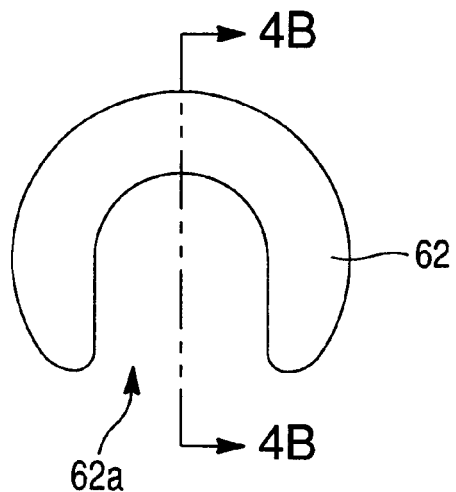
FIG. 4A is a front view of a retainer ring.
Figure 4B:
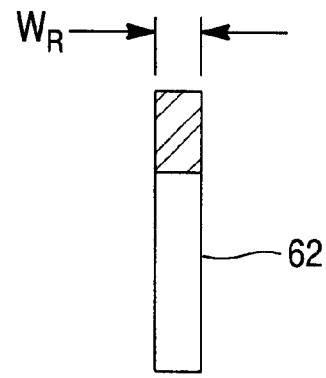
FIG. 4B is a side view of a retainer ring, taken along the line 4B—4B of FIG. 4A.

The axle shaft 20 is connected by a spline 60 to the corresponding side bevel gear 56. A conventional slotted retainer ring 62 is fitted within an annular groove 63 formed on the axle shaft 20 and located between a shoulder 64 on which the external spline 60 is formed, and a terminal shoulder 66 located at an inboard end of the axle shaft. The annular groove 63 has a width $W_G$ defined as a distance between a front wall 63' and a rear wall 63" of the groove 63, as illustrated in FIG. 3. The retainer ring 62 in the form of a conventional C-ring element illustrated in detail in FIGS. 4A and 4B, is well known to those skilled in the art. The C-ring 62 has an open end 62a to enable it to fit within the annular groove 63 of the axle shaft 20. Conventionally, the width $W_G$ of the annular groove 63 is larger than a thickness $W_R$ of the retainer ring 62.

The retainer ring 62 is provided for limiting outward axial movement of the axle shaft 20 relative to the side bevel gear 56 by abutting an end surface 58 thereof. However, each axle shaft is free to move along the spline connection axially inward toward the differential pinion shaft. This amount of an internal axial clearance δ is called an axle shaft endplay.

As illustrated in FIG. 3, the axle shaft endplay is an amount of the internal axial clearance δ of the axle shaft 20. In other words, the endplay is the amount of possible axial movement of the axle shaft 20 between its innermost position when an inboard contact face 67 of the axle shaft 20 is in contact with an outer cylindrical surface 55 of the pinion shaft 54, and its outermost position when the retainer ring 62 abuts the end surface 58 of the side gear 56, as shown in FIG. 3. As could be easily understood by those skilled in the art, the amount of the endplay δ depends, among other factors, on the thickness $W_R$ of the retainer ring 62 and the width $W_G$ of the annular groove 63. Obviously, the narrower annular groove 63 provides less endplay, and vice versa.

Figure 5:
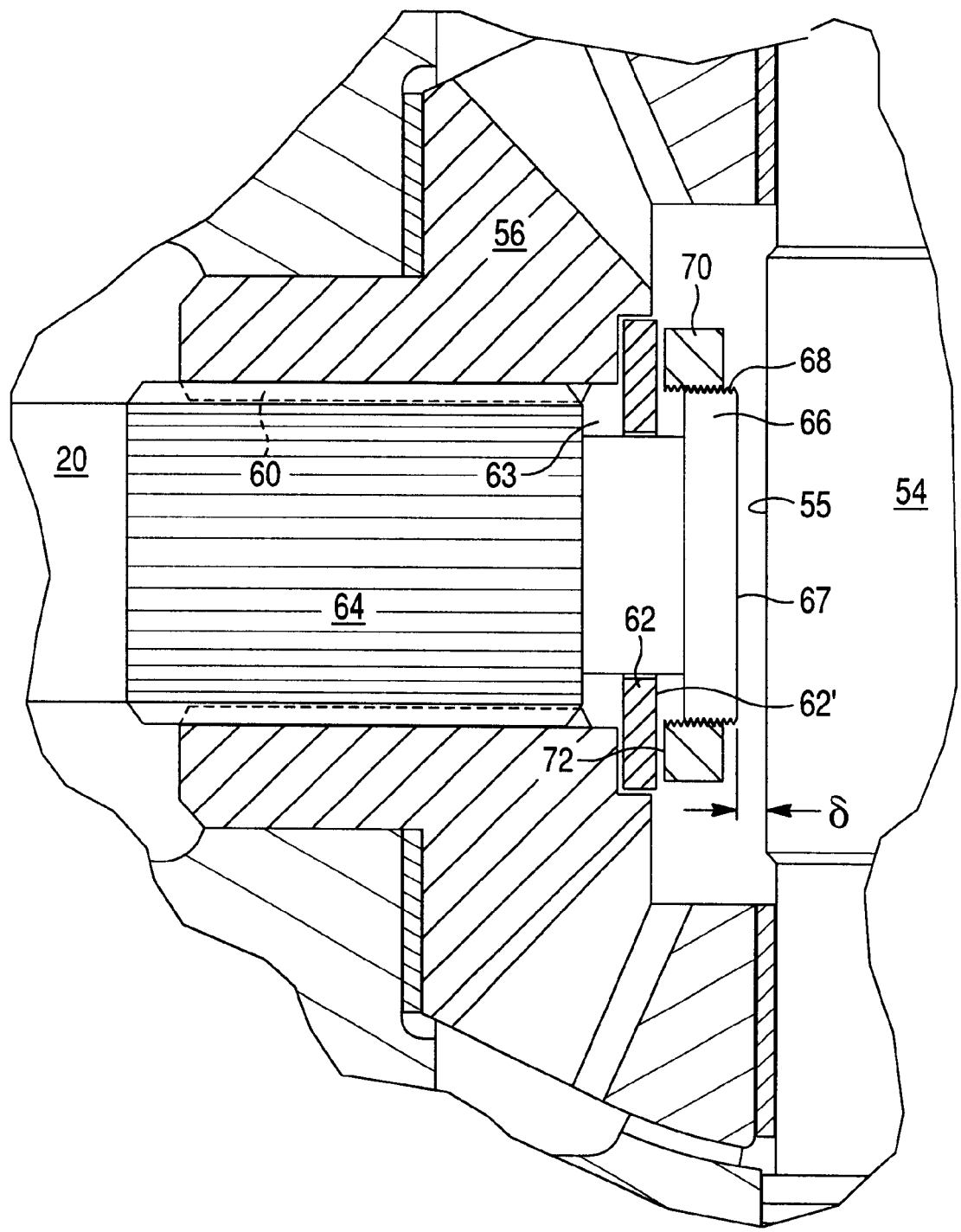
FIG. 5 shows an axle shaft endplay adjustment member in accordance with the preferred embodiment of the present invention.

Further in accordance with the preferred embodiment of the present invention, a cylindrical outer peripheral surface 68 of the terminal shoulder 66 has external threads. As illustrated in FIG. 5, an axle shaft endplay adjustment member 70 provided with internal threads, is threadingly disposed on the outer peripheral surface 68 of the terminal shoulder 66 of each of the axle shaft 20, and may be axially selectively positioned thereon. The endplay adjustment member 70 has an annular contact face 72 adapted to contact an inboard face 62' of the retainer ring 62 in order to limit its axial movement within the groove 63. Therefore, the axial movement of the retainer ring 62 within the groove 63 is limited by the contact face 72 of the endplay adjustment member 70 from the one side and by the rear wall 63" of the groove 63 from the other side. The distance between the rear wall 63" of the groove 63 and the contact face 72 of the endplay adjustment member 70, thus, defines an effective width $W_{GE}$ of the annular groove 63 by setting an effective range of movement of the retainer ring 62 relative to the shaft 20.

It will be obvious to those skilled in the art that selectively positioning the endplay adjustment member 70 allows varying the effective width of the groove 63, thus adjusting the axle shaft endplay δ by limiting movement of the retainer ring 62 within the annular groove 63.

In accordance with another aspect of the present invention, a method for adjusting an endplay δ of the axle shaft 20 is provided. The method is preformed in the following manner: first, a value of a desired endplay $δ=δ_P$ is determined based on the particular operational conditions and the type of the differential assembly by a differential manufacturer. The differential mechanism is partially assembled including the axle shafts 20 and the side gears 56 splined to the axle shafts 20. Then, the retainer ring 62 is mounted into the groove 63 and the endplay adjustment member 70 is threaded into the outer peripheral surface 68 of the terminal shoulder 66 of each of the axle shaft 20. Next, the pinion shaft 54 carrying the bevel pinion gears 50 and 52 is installed in the differential case 48 providing continuous meshing engagement of the pinion gears 50 and 52 with the side gears 56. The axle shafts 20 are then pulled outboard until the retainer rings 62 contact the end surfaces 58 of the side gears 56. After that, the axle shaft endplay δ is measured between the inboard contact face 67 of the axle shaft 20 and the outer cylindrical surface 55 of the pinion shaft 54 by any appropriate measuring tool, such as a conventional feeler gauge 9 (not shown) for each axle shaft. The endplay adjustment member 70 is then rotated on the terminal shoulder 66 so as to attain the effective width $W_{GE}$ of the annular groove 63 that provides the desired endplay $δ_P$. Finally, remaining components of the differential assembly are assembled, thus, completing the process of assembling the differential assembly.

As evident from the foregoing description, the present invention overcomes the drawbacks inherent in the previous designs of the prior art by providing a novel device and method to control the axle shaft endplay.

Therefore, the device and method for adjusting the endplay of the axle shaft in accordance with the present invention solves the need for a solution to the problem of controlling the axle shaft endplay in the vehicular differential assemblies in a simple, efficient and inexpensive manner The foregoing description of the preferred embodiments of the present invention has been presented for the purpose of illustration in accordance with the provisions of the Patent Statutes. It is not intended to be exhaustive or to limit the invention to the precise forms disclosed. Obvious modifications or variations are possible in light of the above teachings. The embodiments disclosed hereinabove were chosen in order to best illustrate the principles of the present invention and its practical application to thereby enable those of ordinary skill in the art to best utilize the invention in various embodiments and with various modifications as are suited to the particular use contemplated, as long as the principles described herein are followed. Thus, changes can be made in the above-described invention without departing from the intent and scope thereof. It will also be understood that words used are words of description rather than a limitation. It is also intended that the scope of the present invention be defined by the claims appended thereto.

What is claimed is:

1. A device for adjusting an axle shaft endplay in a differential assembly, said device comprising:
   an axle shaft having external splines adapted to mate with internal splines of a differential side gear and an annular groove located adjacent to a terminal shoulder provided at an inboard end of said shaft, said groove is provided for receiving a retainer ring, said retainer ring is provided to limit an axial displacement of said axle shaft in an outboard direction; and
   an endplay adjustment member selectively positioned on said terminal shoulder along an axial direction of said axle shaft for variably limiting a range of axial movement of said retainer ring within said groove.

2. The device for adjusting an axle shaft endplay as defined in claim 1, wherein said annular groove includes a front annular wall adjacent to said terminal shoulder and a rear annular wall opposite to said front wall, said endplay adjustment member has a contact face for contacting said retainer ring, said range of axial movement of said retainer ring within said groove is defined as a distance between said rear annular wall of said annular groove and said contact face of said endplay adjustment member.

3. The device for adjusting an axle shaft endplay as defined in claim 1, wherein said retainer ring is a C-ring.

4. The device for adjusting an axle shaft endplay as defined in claim 1, wherein said terminal shoulder has a threaded cylindrical outer peripheral surface and said endplay adjustment member is formed with internal threads mating with threads of said outer peripheral surface of said terminal shoulder.

5. The device for adjusting an axle shaft endplay as defined in claim 1, wherein a width of said annular groove in said axle shaft is larger than a thickness of said retainer ring.

6. A method for adjusting an axle shaft endplay in a differential assembly, said method comprising the steps of:
   (a) assembling a side gear and an axle shaft non-rotatably engaging said side gear, said axle shaft having an annular groove located adjacent to a terminal shoulder provided at an inboard end of said shaft, said groove is provided for receiving a retainer ring, said retainer ring is provided to limit an axial displacement of said axle shaft in an outboard direction;
   (b) mounting said retainer ring in said groove and installing an endplay adjustment member adjustably positioned on said terminal shoulder along an axial direction of said axle shaft;
   (c) installing a differential pinion shaft carrying pinion gears providing continuous meshing engagement thereof with said side gear;
   (d) measuring an axle shaft endplay;
   (e) determining a desired axle shaft endplay;
   (f) moving said endplay adjustment member to an axial position ensuring said desired axle shaft endplay.

7. The method for adjusting an axle shaft endplay in a differential assembly as defined in claim 6, wherein said retainer ring is a C-ring.

8. The method for adjusting an axle shaft endplay in a differential assembly as defined in claim 6, wherein said endplay adjustment member is threaded on a threaded cylindrical outer peripheral surface of said terminal shoulder.

9. The method for adjusting an axle shaft endplay in a differential assembly as defined in claim 6, wherein a width of said annular groove in said axle shaft is larger than a thickness of said retainer ring.

10. The method for adjusting an axle shaft endplay in a differential assembly as defined in claim 6, wherein said axle shaft endplay is measured between an inboard contact face of said axle shaft and an outer cylindrical of surface said pinion shaft when said axle shaft is in its outermost position.

* * * * *